(12) United States Patent
Kim

(10) Patent No.: US 7,576,590 B2
(45) Date of Patent: Aug. 18, 2009

(54) SWING WIDTH CONTROL CIRCUIT AND HIGH VOLTAGE PUMPING CIRCUIT USING THE SAME

(75) Inventor: You Sung Kim, Seoul (KR)

(73) Assignee: Hynix Semiconductor Inc., Icheon-si (KR)

( * ) Notice: Subject to any disclaimer, the term of this patent is extended or adjusted under 35 U.S.C. 154(b) by 158 days.

(21) Appl. No.: 11/497,860

(22) Filed: Aug. 1, 2006

(65) Prior Publication Data
US 2007/0222499 A1    Sep. 27, 2007

(30) Foreign Application Priority Data
Mar. 27, 2006    (KR) .................... 10-2006-0027438

(51) Int. Cl.
*H03K 3/01*    (2006.01)
(52) U.S. Cl. ....................................... 327/536; 327/534
(58) Field of Classification Search .......... 327/534–538
See application file for complete search history.

(56) References Cited
U.S. PATENT DOCUMENTS

| | | | | |
|---|---|---|---|---|
| 5,157,242 | A * | 10/1992 | Hetherington et al. | ...... 219/539 |
| 6,002,599 | A * | 12/1999 | Chow | ..................... 363/59 |
| 6,018,264 | A | 1/2000 | Jin | |
| 6,515,932 | B1 * | 2/2003 | Kubo | ...................... 365/226 |
| 6,784,723 | B2 | 8/2004 | Lee et al. | |
| 6,819,187 | B1 | 11/2004 | Ming et al. | |
| 6,833,748 | B2 | 12/2004 | Cho | |
| 6,954,101 | B2 * | 10/2005 | Imamiya | .................. 327/536 |
| 7,042,275 | B2 * | 5/2006 | Suwa et al. | ............... 327/536 |
| 7,053,657 | B1 | 5/2006 | Peng | |
| 2002/0024377 | A1 * | 2/2002 | Ogura | ....................... 327/536 |

FOREIGN PATENT DOCUMENTS

| | | | |
|---|---|---|---|
| JP | 409285106 A | * | 10/1997 |
| KR | 10-1999-0060848 | | 7/1999 |
| KR | 10-1999-0069607 | | 9/1999 |
| KR | 10-2000-0042475 | | 7/2000 |
| KR | 10-2005-0011542 | | 1/2005 |
| KR | 10-2007-0020460 | | 2/2007 |

* cited by examiner

*Primary Examiner*—Dinh T. Le
(74) *Attorney, Agent, or Firm*—John P. White; Cooper & Dunham LLP

(57) ABSTRACT

A swing width control circuit and a high voltage pumping circuit using the same are disclosed. The swing width control circuit includes a swing width controller for receiving a first pumping signal having a first swing width and generating a second pumping signal having a second swing width larger than the first swing width of the first pumping signal, in accordance with a level of a supply voltage to pump or precharge a voltage of a specific node, and a swing width holding device for maintaining a swing width of the specific node to be equal to the second swing width of the second pumping signal.

9 Claims, 4 Drawing Sheets

SWING WIDTH CONTROL CIRCUIT AND HIGH VOLTAGE PUMPING CIRCUIT USING THE SAME

BACKGROUND

1. Field of the Disclosure

The present disclosure relates to a swing width control circuit and a high voltage pumping circuit using the same, and more particularly to a swing width control circuit for, when a supply voltage VDD is relatively low, significantly increasing the swing width of a pumping signal for a pumping operation for generation of a high voltage VPP, so that pumping capability can be improved under the condition of the low supply voltage VDD, and a high voltage pumping circuit using the same.

2. Description of the Related Art

In general, a dynamic random access memory (DRAM) is a memory device including a plurality of memory cells, each of which is composed of one transistor and one capacitor. In this DRAM, data can be written into or read from each memory cell and a high voltage VPP is required to drive word lines. This high voltage VPP is generated by a high voltage generation circuit in consideration of a supply voltage VDD and threshold voltage Vth of a MOS transistor constituting the cell transistor. The high voltage generation circuit includes an oscillation circuit, a charge pumping circuit, etc. The oscillation circuit is operated in response to an enable signal to generate an oscillation signal with a. certain period, and the charge pumping circuit pumps the supply voltage VDD, which is an external voltage, in response to the oscillation signal to generate the high voltage VPP.

In a memory device having a low supply voltage VDD of about 1.8V, the high voltage VPP is on the order of 3 to 4V. The high voltage VPP is higher than the supply voltage VDD and is generated by pumping the supply voltage VDD using the pumping circuit. In particular, in the case where the supply voltage VDD is low, a high voltage pumping circuit such as a VPP tripler is used because it is difficult to generate the high voltage VPP by pumping the low supply voltage VDD.

However, when the supply voltage VDD is low, even though the VPP tripler is used, degradation of high voltage pumping efficiency occurs continuously as indicated by "A" in FIG. 1, resulting in a level reduction in the pumped high voltage VPP.

SUMMARY OF THE DISCLOSURE

Therefore, the present disclosure provides a number of examples of a swing width control circuit for, when a supply voltage VDD is relatively low, significantly increasing the swing width of a pumping signal for a pumping operation for generation of a high voltage VPP, so that pumping capability can be improved under the condition of the low supply voltage VDD, and a high voltage pumping circuit using the same.

In accordance with an aspect of the present disclosure, there is provided a swing width control circuit comprising: a swing width controller for receiving a first pumping signal having a first swing width and generating a second pumping signal having a second swing width larger than the first swing width of the first pumping signal according to a level of a supply voltage to pump or precharge a voltage of a specific node; and a swing width holding device for maintaining a swing width of the specific node to be equal to the second swing width of the second pumping signal.

Preferably, the swing width controller comprises: a supply voltage detector for generating a control signal having a first level when the supply voltage is higher than or equal to a predetermined reference voltage and a second level when the supply voltage is lower than the reference voltage; and a swing width selector for receiving the control signal and the first pumping signal and outputting the first pumping signal when the control signal has the first level and the second pumping signal when the control signal has the second level.

Preferably, the swing width selector comprises: a signal input unit for pulling a first node up and transferring the first pumping signal to a second node, when the control signal has the first level, and transferring the first pumping signal to the first node when the control signal has the second level; and a signal processor connected between the first node and the second node, the signal processor generating the second pumping signal and outputting it to the second node, when the first pumping signal is transferred to the first node.

Preferably, the signal input unit comprises: first and second transfer gates selectively turned on in response to the control signal; and a pull-up device for pulling the first node up in response to the control signal, wherein the first transfer gate transfers the first pumping signal to the first node and the second transfer gate transfers the first pumping signal to the second node.

Preferably, the signal processor comprises: a first capacitor connected between the first node and a third node; a buffer connected to the first node; a second capacitor connected between an output terminal of the buffer and a fourth node; a first pull-up device connected between the third node and the supply voltage, the first pull-up device pulling the third node up in response to a signal from the fourth node; a second pull-up device connected between the fourth node and the supply voltage, the second pull-up device pulling the fourth node up in response to a signal from the third node; a first transistor connected between the fourth node and a fifth node, the first transistor being turned on in response to a signal from the first node; and a third capacitor connected between the fifth node and the second node.

The first pull-up device and the second pull-up device may be NMOS transistors and the first transistor may be a PMOS transistor.

The signal processor may further comprise a second transistor connected between the fifth node and a ground voltage, the second transistor being turned on in response to the signal from the first node.

The second swing width may be set to twice the first swing width.

The swing width holding device may be a capacitor.

In accordance with another aspect of the present disclosure, there is provided a high voltage pumping circuit comprising: a first pumping circuit including a precharge circuit for precharging a first node, a first swing width controller for outputting a pumping signal for pumping of a voltage of the first node, and a first swing width holding device for maintaining a swing width of the first node to be equal to that of the pumping signal from the first swing width controller; a second pumping circuit including a first precharge device for precharging a second node in response to a signal from the first node, a second swing width controller for outputting a pumping signal for pumping of a voltage of the second node, and a second swing width holding device for maintaining a swing width of the second node to be equal to that of the pumping signal from the second swing width controller; and a first transfer device for transferring the voltage of the second node in response to a first transfer control signal, wherein each of the first and second swing width controllers receives a first pumping signal having a first swing width and generates a second pumping signal having a second swing width larger than the first swing width of the first pumping signal according to a level of a supply voltage.

The high voltage pumping circuit may further comprise: a third pumping circuit including a second precharge device for precharging a third node in response to the signal from the first node, a third swing width controller for outputting a pumping signal for pumping of a voltage of the third node, and a third swing width holding device for maintaining a swing width of the third node to be equal to that of the pumping signal from the third swing width controller; and a first control signal generator including a third precharge device for precharging a fourth node in response to the signal from the first node, a first swing width changer for changing a swing width of a signal from the third node, and a fourth swing width holding device for maintaining a swing width of the fourth node to be equal to that of an output signal from the first swing width changer to generate the first transfer control signal, wherein the third swing width controller receives the first pumping signal having the first swing width and generates the second pumping signal having the second swing width larger than the first swing width of the first pumping signal according to the level of the supply voltage.

The first swing width changer may output a signal swinging between a ground voltage and a high-level voltage of the signal from the third node.

Preferably, the first swing width changer comprises: a pull-up device connected between the third node and a fifth node, the pull-up device pulling the fifth node up in response to the supply voltage; and a pull-down device connected between the fifth node and a ground voltage, the pull-down device pulling the fifth node down in response to an enable signal.

Preferably, each of the first to third swing width controllers comprises: a supply voltage detector for generating a control signal having a first level when the supply voltage is higher than or equal to a predetermined reference voltage and a second level when the supply voltage is lower than the reference voltage; and a swing width selector for receiving the control signal and the first pumping signal and outputting the first pumping signal when the control signal has the first level and the second pumping signal when the control signal has the second level.

Preferably, the swing width selector comprises: a signal input unit for pulling a fifth node up and transferring the first pumping signal to a sixth node, when the control signal has the first level, and transferring the first pumping signal to the fifth node when the control signal has the second level; and a signal processor connected between the fifth node and the sixth node, the signal processor generating the second pumping signal and outputting it to the sixth node, when the first pumping signal is transferred to the fifth node.

Preferably, the signal input unit comprises: first and second transfer gates selectively turned on in response to the control signal; and a pull-up device for pulling the fifth node up in response to the control signal, wherein the first transfer gate transfers the first pumping signal to the fifth node and the second transfer gate transfers the first pumping signal to the sixth node.

Preferably, the signal processor comprises: a first capacitor connected between the fifth node and a seventh node; a buffer connected to the fifth node; a second capacitor connected between an output terminal of the buffer and an eighth node; a first pull-up device connected between the seventh node and the supply voltage, the first pull-up device pulling the seventh node up in response to a signal from the eighth node; a second pull-up device connected between the eighth node and the supply voltage, the second pull-up device pulling the eighth node up in response to a signal from the seventh node; a first transistor connected between the eighth node and a ninth node, the first transistor being turned on in response to a signal from the fifth node; and a third capacitor connected between the ninth node and the sixth node.

The first pull-up device and the second pull-up device may be NMOS transistors and the first transistor may be a PMOS transistor.

The signal processor may further comprise a second transistor connected between the ninth node and a ground voltage, the second transistor being turned on in response to the signal from the fifth node.

The second swing width may be set to twice the first swing width.

The first to fourth swing width holding devices may be capacitors.

Preferably, the precharge circuit comprises: a fourth precharge device connected between the supply voltage and the first node, the fourth precharge device precharging the first node in response to the supply voltage; and a fifth precharge device connected between the supply voltage and the first node, the fifth precharge device precharging the first node in response to the signal from the third node.

The high voltage pumping circuit may further comprise: a fourth pumping circuit including a fourth swing width controller for outputting a pumping signal for pumping of a voltage of a fifth node to which the voltage of the second node is transferred through the first transfer device, and a fifth swing width holding device for maintaining a swing width of the fifth node to be equal to that of the pumping signal from the fourth swing width controller; and a second transfer device for transferring the voltage of the fifth node in response to a second transfer control signal, wherein the fourth swing width controller receives the first pumping signal having the first swing width and generates the second pumping signal having the second swing width larger than the first swing width of the first pumping signal when the supply voltage is lower than a predetermined reference voltage.

The high voltage pumping circuit may further comprise: a fifth pumping circuit including a fourth precharge device for precharging a sixth node in response to a signal from the fourth node, a fifth swing width controller for outputting a pumping signal for pumping of a voltage of the sixth node, and a sixth swing width holding device for maintaining a swing width of the sixth node to be equal to that of the pumping signal from the fifth swing width controller; and a second control signal generator including a fifth precharge device for precharging a seventh node in response to the signal from the fourth node, a second swing width changer for changing a swing width of a signal from the sixth node, and a seventh swing width holding device for maintaining a swing width of the seventh node to be equal to that of an output signal from the second swing width changer to generate the second transfer control signal.

Preferably, the second swing width changer comprises: a pull-up device connected between the sixth node and an eighth node, the pull-up device pulling the eighth node up in response to the supply voltage; and a pull-down device connected between the eighth node and a ground voltage, the pull-down device pulling the eighth node down in response to an enable signal.

BRIEF DESCRIPTION OF DRAWINGS

The above and other objects, features and other advantages of the present disclosure will be more clearly understood from the following detailed description taken in conjunction with the accompanying drawings, in which.

DESCRIPTION OF PREFERRED EMBODIMENTS

Figure 1:
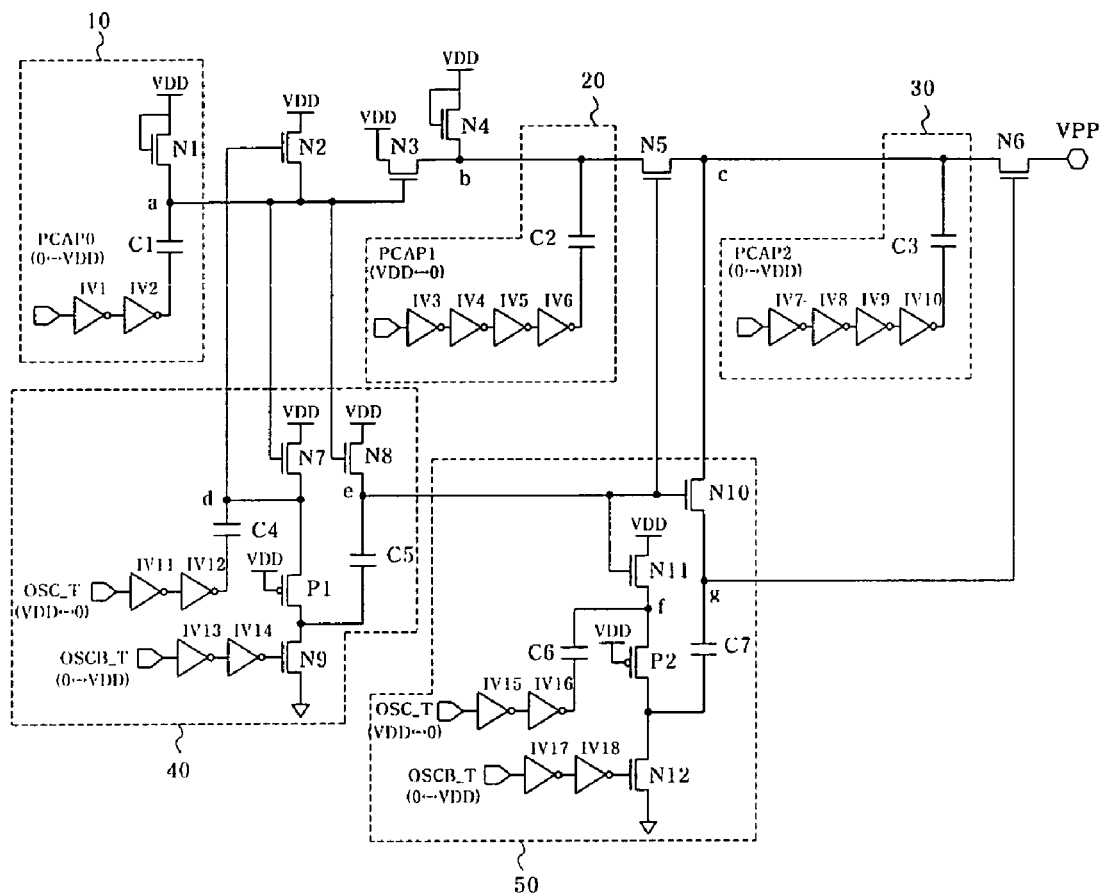
FIG. 1 is an output waveform diagram of a conventional VPP tripler.

Reference will now be made in detail to preferred embodiments of the present disclosure, examples of which are illustrated in the accompanying drawings, wherein like reference numerals refer to like elements throughout. The embodiments are described below to explain the present disclosure by referring to the figures.

Figure 2:
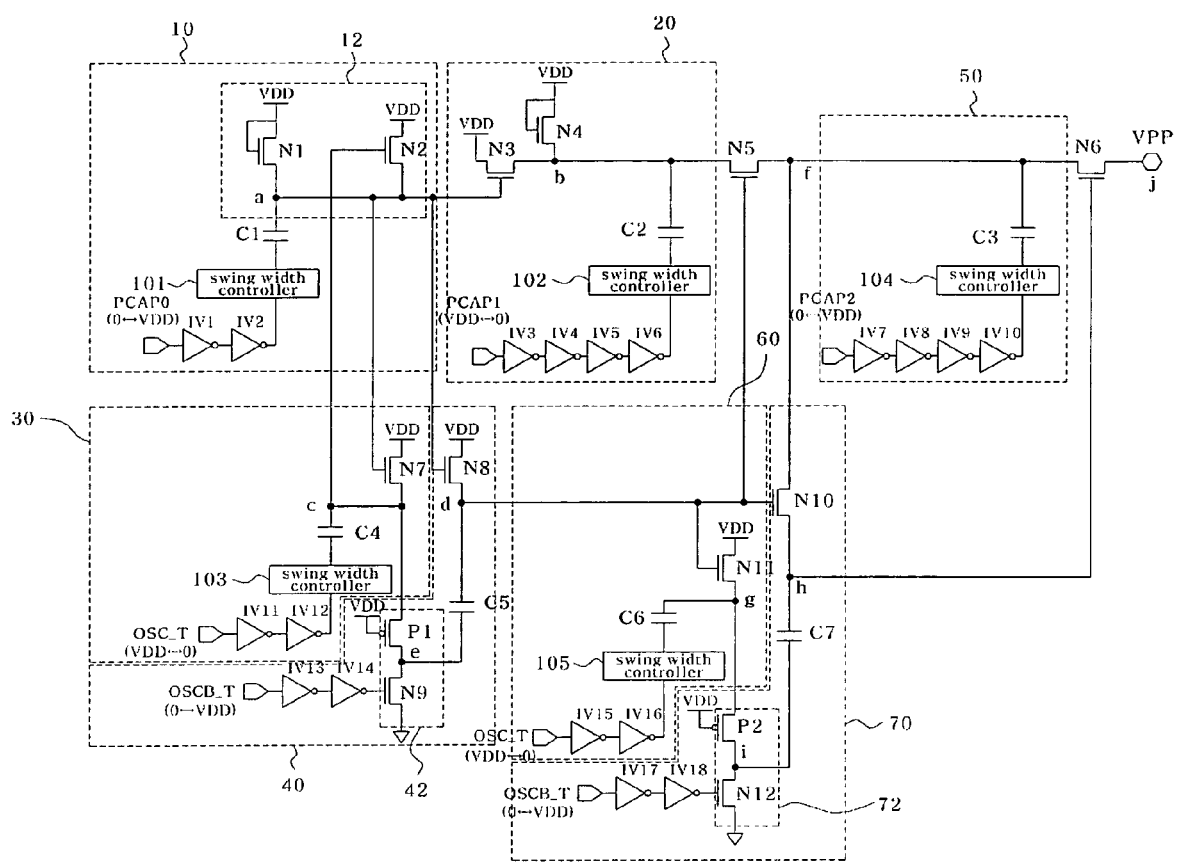
FIG. 2 is a circuit diagram showing the configuration of a VPP tripler according to an exemplary embodiment of the present disclosure.
Figure 3:
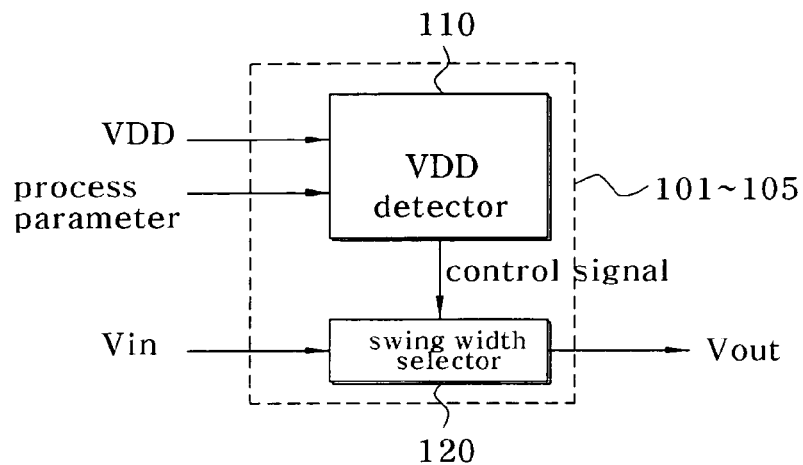
FIG. 3 is a block diagram of a swing width controller in FIG. 2.
Figure 4:
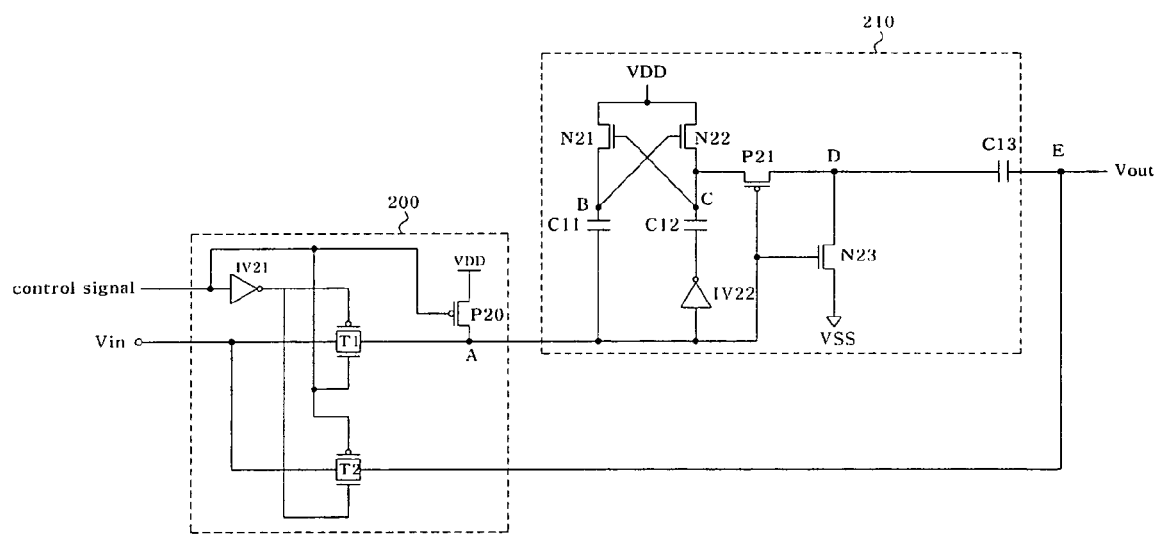
FIG. 4 is a circuit diagram of a swing width selector in FIG. 3.

FIG. 2 is a circuit diagram showing the configuration of a VPP tripler according to an exemplary embodiment of the present disclosure, FIG. 3 is a block diagram of a swing width controller in FIG. 2, and FIG. 4 is a circuit diagram of a swing width selector in FIG. 3.

Referring to FIG. 2, the VPP tripler according to the present embodiment comprises a first pumping circuit 10 including a precharge circuit 12 for precharging a node a, a first swing width controller 101 for outputting a pumping signal for pumping of the voltage of the node a, and a capacitor C1 for maintaining the swing width of the node a to be equal to that of the pumping signal from the first swing width controller 101. The VPP tripler according to the present embodiment further comprises a second pumping circuit 20 including an NMOS transistor N3 for precharging a node b in response to a signal from the node a, a second swing width controller 102 for outputting a pumping signal for pumping of the voltage of the node b, and a capacitor C2 for maintaining the swing width of the node b to be equal to that of the pumping signal from the second swing width controller 102. The VPP tripler according to this embodiment further comprises an NMOS transistor N5 for transferring the voltage of the node b to a node f in response to a first transfer control signal.

The precharge circuit 12 includes an NMOS transistor N1 connected between a supply voltage VDD and the node a and adapted for precharging the node a in response to the supply voltage VDD, and an NMOS transistor N2 connected between the supply voltage VDD and the node a and adapted for precharging the node a in response to a signal from a node c.

The VPP tripler according to this embodiment further comprises a third pumping circuit 30 including an NMOS transistor N7 for precharging the node c in response to the signal from the node a, a third swing width controller 103 for outputting a pumping signal for pumping of the voltage of the node c, and a capacitor C4 for maintaining the swing width of the node c to be equal to that of the pumping signal from the third swing width controller 103. The VPP tripler according to the present embodiment further comprises a first control signal generator 40 including an NMOS transistor N8 for precharging a node d in response to the signal from the node a, a first swing width changer 42 for changing the swing width of the signal from the node c, and a capacitor C5 for maintaining the swing width of the node d to be equal to that of an output signal from the first swing width changer 42 to generate the first transfer control signal.

The first swing width changer 42 is adapted to output a signal swinging between a ground voltage and a high-level voltage of the signal from the node c. To this end, the first swing width changer 42 includes a PMOS transistor P1 connected between the node c and a node e and adapted for pulling the node e up in response to the supply voltage VDD, and an NMOS transistor N9 connected between the node e and the ground voltage and adapted for pulling the node e down in response to an enable signal OSCB_T.

The VPP tripler according to the present embodiment further comprises a fourth pumping circuit 50 including a fourth swing width controller 104 for outputting a pumping signal for pumping of the voltage of the node f to which the voltage of the node b is transferred through the NMOS transistor N5, and a capacitor C3 for maintaining the swing width of the node f to be equal to that of the pumping signal from the fourth swing width controller 104. The VPP tripler according to the present embodiment further comprises an NMOS transistor N6 for transferring the voltage of the node f in response to a second transfer control signal from a node h, and a fifth pumping circuit 60 including an NMOS transistor N11 for precharging a node q in response to a signal from the node d, a fifth swing width controller 105 for outputting a pumping signal for pumping of the voltage of the node g, and a capacitor C6 for maintaining the swing width of the node g to be equal to that of the pumping signal from the fifth swing width controller 105. The VPP tripler according to the present embodiment further comprises a second control signal generator 70 including an NMOS transistor N10 for precharging the node h in response to the signal from the node d, a second swing width changer 72 for changing the swing width of a signal from the node g, and a capacitor C7 for maintaining the swing width of the node h to be equal to that of an output signal from the second swing width changer 72 to generate the second transfer control signal.

The second swing width changer 72 includes a PMOS transistor P2 connected between the node g and a node i and adapted for pulling the node i up in response to the supply voltage VDD, and an NMOS transistor N12 connected between the node i and the ground voltage and adapted for pulling the node i down in response to the enable signal OSCB_T.

The configuration of each of the first to fifth swing width controllers 101 to 105 will hereinafter be described in detail with reference to FIGS. 3 and 4.

Each of the first to fifth swing width controllers 101 to 105 includes, as shown in FIG. 3, a VDD detector 110 for generating a control signal having a low level when the supply voltage VDD is higher than or equal to a predetermined reference voltage Vref and a high level when the supply voltage VDD is lower than the reference voltage Vref, and a swing width selector 120 for receiving the control signal and a first pumping signal Vin (PCAP0, PCAP1, PCAP2 or OSC_T) with a swing width of a VDD level and providing, as its output signal Vout, the first pumping signal Vin when the control signal has the low level and a second pumping signal with a swing width of a 2VDD level when the control signal has the high level, to pump or precharge the voltage of a specific node. The VDD detector 110 may be made up of a plurality of transistors connected in series by using threshold voltages Vth thereof. With this configuration, the VDD detector 110 generates the control signal of the high level or low level according to the VDD level.

In FIG. 4, the swing width selector 120 includes a signal input unit 200 for pulling a node A up and transferring the first pumping signal Vin to a node E, when the control signal has the low level, and transferring the first pumping signal Vin to the node A when the control signal has the high level, and a signal processor 210 connected between the node A and the node E and adapted for generating the second pumping signal and outputting it to the node E, when the first pumping signal Vin is transferred to the node A. In more detail, the signal input unit 200 includes first and second transfer gates T1 and T2 selectively turned on in response to the control signal, and a PMOS transistor P20 for pulling the node A up in response to the low-level control signal. The first transfer gate T1 transfers the first pumping signal Vin to the node A and the second transfer gate T2 transfers the first pumping signal Vin to the node E. The signal processor 210 includes a capacitor C11 connected between the node A and a node B, an inverter IV22 connected to the node A, a capacitor C12 connected between an output terminal of the inverter IV22 and a node C, an NMOS transistor N21 connected between the node B and the supply voltage VDD and adapted for pulling the node B up in response to a signal from the node C, an NMOS transistor N22 connected between the node C and the supply voltage VDD and adapted for pulling the node C up in response to a signal from the node B, a PMOS transistor P21 connected between the node C and a node D and turned on or off in response to a signal from the node A, a capacitor C13 connected between the node D and the node E, and an NMOS transistor N23 connected between the node D and the ground voltage and turned on or off in response to the signal from the node A.

Preferably, the reference voltage Vref is 1.5V, the pumped high voltage VPP is 2.5~4V, the high voltage pumping capability of the VPP tripler is 0.5~9 mA/pump, and the VDD voltage detection range of the VDD detector 110 is 0.5~1.5V. In a semiconductor memory device, it is typically preferable that VPP current is 1·100 μA in a standby state and 10 μA~100 mA in an active state, and the period of a VPP oscillator is 10~100 ns. Here, the oscillator period may be selectively changed in a test mode or by fuse trimming.

The operation of each of the swing width controllers 101 to 105 of the present disclosure will hereinafter be described with reference to FIGS. 3 and 4.

First, the VDD detector 110 of each of the swing width controllers 101 to 105 detects the supply voltage VDD, compares it with the predetermined reference voltage Vref and generates the control signal according to the comparison result. At this time, the generated control signal has the low level when the detected supply voltage VDD is higher than or equal to the reference voltage Vref and the high level when the supply voltage VDD is lower than the reference voltage Vref. Here, the VDD detector 110 may be implemented by a voltage detection circuit used in an existing voltage pumping device.

Then, the control signal generated by the VDD detector 110 is inputted to the swing width selector 120 along with the first pumping signal Vin (PCAP0, PCAP1, PCAP2 or OSC_T) with the swing width of the VDD level. When the inputted control signal has the high level, namely, the supply voltage VDD is lower than the reference voltage Vref, the transfer gate T1 is turned on to transfer the first pumping signal Vin (PCAP0, PCAP1, PCAP2 or OSC_T) to the node A. At this time, the node C of the signal processor 210 is set to be precharged to the VDD level, so that the signal processor 210 outputs the second pumping signal with the swing width of the 2VDD level to the node E. That is, when the first pumping signal Vin (PCAP0, PCAP1, PCAP2 or OSC_T) assumes a high level (VDD), the node B is given the VDD level by the capacitor C11, which is a charge holding device, under the condition that the PMOS transistor P21 is turned off. As a result, the NMOS transistor N22 is turned on, thereby causing the node C to be precharged to the VDD level. At this time, because the NMOS transistor N23 is turned on, the node D becomes low in level. Thereafter, at the time that the first pumping signal Vin (PCAP0, PCAP1, PCAP2 or OSC_T) becomes low in level, a signal at the output terminal of the inverter IV22 assumes the high level (VDD), so that the node C is pumped to the 2VDD level by the capacitor C12. At this time, because the PMOS transistor P21 is turned on, the voltage level of the node D becomes the 2VDD level. In other words, when the high-level control signal is inputted, the node D is changed from a low level (ground level) to a high level (2VDD) and this voltage swing width of the node D is transferred to the node E through the capacitor C13, which is a charge holding device. As a result, the pumping signal Vout outputted at the node E has the swing width of the 2VDD level. On the other hand, when the inputted control signal has the low level, namely, the supply voltage VDD is higher than or equal to the reference voltage Vref, the transfer gate T2 is turned on to transfer the first pumping signal Vin (PCAP0, PCAP1, PCAP2 or OSC_T) to the node E. As a result, the first pumping signal Vin (PCAP0, PCAP1, PCAP2 or OSC_T) is outputted as the pumping signal Vout at the node E. At this time, the PMOS transistor P20 is turned on, thereby causing a high-level DC voltage to be inputted to the signal processor 210. Thus, the NMOS transistor N23 remains on and the node D is maintained at the ground level.

To sum up, each of the swing width controllers 101 to 105 of the present disclosure adjusts the swing width of the inputted first pumping signal Vin (PCAP0, PCAP1, PCAP2 or OSC_T) to the 2VDD level and outputs the resulting second pumping signal as the pumping signal Vout, when the supply voltage VDD is lower than the reference voltage Vref, and outputs the inputted first pumping signal Vin (PCAP0, PCAP1, PCAP2 or OSC_T) directly as the pumping signal Vout when the supply voltage VDD is higher than or equal to the reference voltage Vref. That is, each of the swing width controllers 101 to 105 of the present disclosure increases the swing width of the pumping signal Vout when the supply voltage VDD is low, so that pumping efficiency can be improved under the condition of the low supply voltage VDD.

Next, the operation of the VPP tripler with the swing width controllers 101 to 105 of the present disclosure as stated above will be described with reference to FIG. 2.

First, when the supply voltage VDD is lower than the reference voltage Vref, the swing width of the first pumping signal Vin (PCAP0, PCAP1, PCAP2 or OSC_T) inputted to each of the swing width controllers 101 to 105 of the present disclosure is adjusted to the 2VDD level and the resulting second pumping signal is outputted as the pumping signal Vout. In this case, the VPP tripler is operated in the following manner.

When the supply voltage VDD is applied, the NMOS transistors N1 and N4 are turned on, thereby causing the node a and node b to be precharged to a VDD-Vth (a threshold voltage of each NMOS transistor) level. Then, because the swing width controller 101 receives the pumping signal PCAP0 with the swing width of the VDD level and outputs the pumping signal Vout with the swing width of the 2VDD level, the node a is pumped with a swing width of a 3VDD-Vth level by the capacitor C1 which maintains the swing widths of voltages applied to both ends thereof equal.

Then, the NMOS transistors N3, N7 and N8 are turned on by the pumped voltage of the node a, so that the node b, node c and node d are precharged to the VDD level. At this time, the node b is pumped by the pumping signal with the swing width of the 2VDD level from the swing width controller 102 of the second pumping circuit 20, so as to have a swing width of a 3VDD level, and the node c is pumped by the pumping signal with the swing width of the 2VDD level from the swing width controller 103, so as to have the swing width of the 3VDD level. Meanwhile, the node a is precharged to the VDD level by the NMOS transistor N2 turned on by the voltage of the node c, and then pumped by the pumping signal with the swing width of the 2VDD level from the swing width controller 101, so as to have the swing width of the 3VDD level. In brief, the node a to node c are precharged to the 3VDD level and the node d is precharged to the VDD level.

Thereafter, the PMOS transistor P1 is turned on by the signal from the node c precharged to the 3VDD level, so as to pull the node e up to the 3VDD level, and the NMOS transistor N9 is turned on by the enable signal OSCB_T to pull the node e down to the ground level. As a result, the voltage of the node e has the swing width of the 3VDD level. Also, because the swing width of the node d becomes equal to that of the node e by the capacitor C5, the voltage of the node d swings from the VDD level to a 4VDD level. The NMOS transistor N5 is turned on by the voltage of the node D which swings in this manner, so as to transfer the voltage of the node b to the node f, thereby causing the voltage level of the node f to become the 3VDD level. Thereafter, the node f is pumped to a 5VDD level by the pumping signal with the swing width of the 2VDD level from the swing width controller 104 of the fourth pumping circuit 50.

Meanwhile, the NMOS transistors N10 and N11 are turned on by the voltage of the node d pumped to the 4VDD level. As a result, the node g is precharged to the VDD level, and the voltage of the node f is transferred to the node h, thereby causing the node h to be precharged to the 3VDD level. At this time, the node g is pumped to the 3VDD level by the pumping signal with the swing width of the 2VDD level from the swing width controller 105. Then, the PMOS transistor P2 is turned on by the signal from the node q precharged to the 3VDD level, so as to pull the node i up to the 3VDD level, and the NMOS transistor N12 is turned on by the enable signal OSCB_T to pull the node i down to the ground level. As a result, the voltage of the node i has the swing width of the 3VDD level. Thereafter, the swing width of the node i is transferred to the node h through the capacitor C7, so that the voltage of the node h swings from the 3VDD level to a 6VDD level. The NMOS transistor N6 is turned on by the voltage of the node h which swings in this manner, so as to transfer the voltage of the 5VDD level of the node f to a node j. Consequently, a high voltage VPP pumped to the 5VDD level is outputted at the node j.

Next, when the supply voltage VDD is higher than or equal to the reference voltage Vref, the first pumping signal Vin (PCAP0, PCAP1, PCAP2 or OSC_T) inputted to each of the swing width controllers 101 to 105 of the present disclosure is outputted directly as the pumping signal Vout. In this case, the VPP tripler is operated in the following manner.

When the supply voltage VDD is applied, the NMOS transistors N1 and N4 are turned on, thereby causing the node a and node b to be precharged to the VDD-Vth (the threshold voltage of each NMOS transistor) level. Then, because the swing width controller 101 receives the pumping signal PCAP0 with the swing width of the VDD level and outputs the pumping signal Vout with the swing width of the VDD level, the node a is pumped with a swing width of a 2VDD-Vth level by the capacitor C1 which maintains the swing widths of voltages applied to both ends thereof equal.

Then, the NMOS transistors N3, N7 and N8 are turned on by the pumped voltage of the node a, so that the node b, node c and node d are precharged to the VDD level. At this time, the node b is pumped by the pumping signal with the swing width of the VDD level from the swing width controller 102 of the second pumping circuit 20, so as to have the swing width of the 2VDD level, and the node c is pumped by the pumping signal with the swing width of the VDD level from the swing width controller 103, so as to have the swing width of the 2VDD level. Meanwhile, the node a is precharged to the VDD level by the NMOS transistor N2 turned on by the voltage of the node c, and then pumped by the pumping signal with the swing width of the VDD level from the swing width controller 101, so as to have the swing width of the 2VDD level. In brief, the node a to node c are precharged to the 2VDD level and the node d is precharged to the VDD level.

Thereafter, the PMOS transistor P1 is turned on by the signal from the node c precharged to the 2VDD level, so as to pull the node e up to the 2VDD level, and the NMOS transistor N9 is turned on by the enable signal OSCB_T to pull the node e down to the ground level. As a result, the voltage of the node e has the swing width of the 2VDD level. Also, because the swing width of the node d becomes equal to that of the node e by the capacitor C5, the voltage of the node d swings from the VDD level to the 3VDD level. The NMOS transistor N5 is turned on by the voltage of the node d which swings in this manner, so as to transfer the voltage of the node b to the node f, thereby causing the voltage level of the node f to become the 2VDD level. Then, the node f is pumped to the 3VDD level by the pumping signal with the swing width of the VDD level from the swing width controller 104 of the fourth pumping circuit 50.

Meanwhile, the NMOS transistors N10 and N11 are turned on by the voltage of the node d pumped to the 3VDD level. As a result, the node g is precharged to the VDD level, and the voltage of the node f is transferred to the node H, thereby causing the node h to be precharged to the 2VDD level. At this time, the node g is pumped to the 2VDD level by the pumping signal with the swing width of the VDD level from the swing width controller 105. Then, the PMOS transistor P2 is turned on by the signal from the node g precharged to the 2VDD level, so as to pull the node i up to the 2VDD level, and the NMOS transistor N12 is turned on by the enable signal OSCB_T to pull the node i down to the ground level. As a result, the voltage of the node i has the swing width of the 2VDD level. Thereafter, the swing width of the node i is transferred to the node h through the capacitor C7, so that the voltage of the node h swings from the 2VDD level to the 4VDD level. The NMOS transistor N6 is turned on by the voltage of the node h which swings in this manner, so as to transfer the voltage of the 3VDD level of the node f to the node j. Consequently, a high voltage VPP pumped to the 3VDD level is outputted at the node j.

Figure 5:
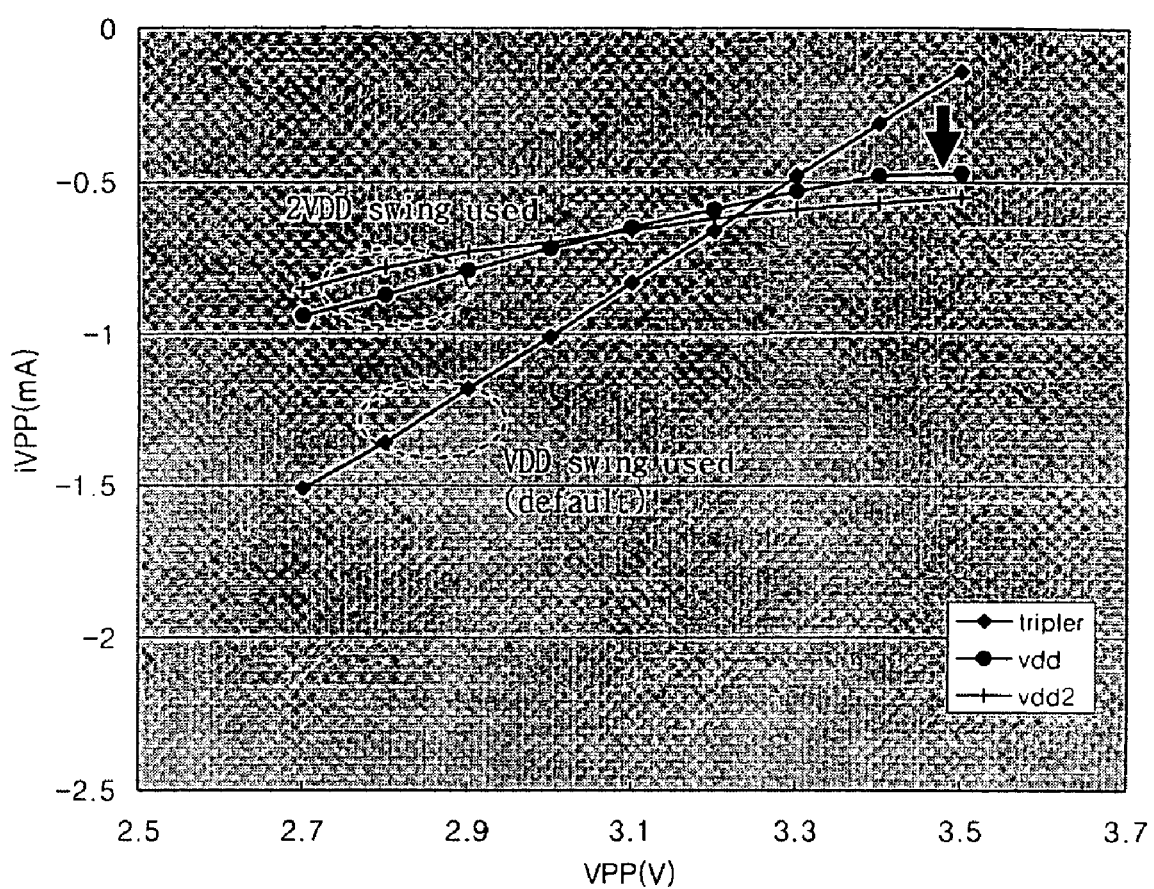
FIG. 5 is an output waveform diagram of the VPP tripler according to the present disclosure.

As described above, in order to improve pumping capability under the condition of the low supply voltage VDD, the VPP tripler of the present embodiment pumps the high voltage VPP using the swing width controllers 101 to 105, each of which increases the swing width of the pumping signal to the 2VDD level under the condition of the low supply voltage VDD. That is, the VPP tripler of the present embodiment increases pumping efficiency under the condition of the low supply voltage VDD by pumping the high voltage VPP to the 5VDD level when the supply voltage VDD is lower than the reference voltage, whereas pumping the high voltage VPP to the 3VDD level when the supply voltage VDD is higher than or equal to the reference voltage. This can be seen from FIG. 5 which is an output waveform diagram of the VPP tripler according to the present embodiment. In other words, it can be seen from FIG. 5 that the pumping efficiency in the case of increasing the swing width of the pumping signal PCAP0, PCAP1, PCAP2 or OSC_T to the 2VDD level under the condition of the low supply voltage VDD using each of the swing width controllers 101 to 105 of the present disclosure is higher than that in the case where the swing width is the VDD level. Although the swing width control circuit of the present disclosure has been disclosed in the present embodiment to be used in the VPP tripler, among high voltage pumping circuits, for illustrative purposes, the present disclosure is not limited thereto and is applicable to other conventional high voltage pumping circuits.

As apparent from the above description, the present disclosure provides a swing width control circuit and a high voltage pumping circuit using the same. When a supply voltage VDD is relatively low, the swing width of a pumping signal for a pumping operation for generation of a high voltage VPP is significantly increased, so that pumping capability can be improved under the condition of the low supply voltage VDD.

Although examples and preferred embodiments of the present disclosure have been provided for illustrative purposes, those skilled in the art will appreciate that various modifications, additions and substitutions are possible, without departing from the scope and spirit of the disclosure as disclosed in the accompanying claims. For example, elements and/or features of different examples and illustrative embodiments may be combined with each other and/or substituted for each other within the scope of this disclosure and appended claims.

What is claimed is:

1. A swing width control circuit comprising:
   a first swing width controller configured to receive a supply voltage and a first pumping signal having a first swing width, compare said supply voltage to a predetermined reference voltage, and output the first pumping signal to a specific node when the supply voltage is higher than or equal to the predetermined supply voltage,
   and when the supply voltage is lower than the predetermined reference voltage, generate and output a second pumping signal having a second swing width larger than the first swing width of the first pumping signal, to perform at least one of pump and precharge a voltage of the specific node; and
   a swing width holding device coupled to the specific node to maintain a swing width of the specific node to be equal to the second swing width of a voltage of the second pumping signal.

2. The swing width control circuit as set forth in claim 1, wherein the swing width controller comprises:
   a supply voltage detector configured to generate a control signal having a first level when the supply voltage is higher than or equal to said predetermined reference voltage, and having a second level when the supply voltage is lower than the reference voltage; and
   a swing width selector configured to receive the control signal and the first pumping signal, and output the first pumping signal when the control signal has the first level and output the second pumping signal when the control signal has the second level.

3. The swing width control circuit as set forth in claim 2, wherein the swing width selector comprises:
   a signal input unit configured to pull a first node up and transfer the first pumping signal to a second node, when the control signal has the first level, and transfer the first pumping signal to the first node when the control signal has the second level; and
   a signal processor connected between the first node and the second node, the signal processor generating the second pumping signal and outputting it to the second node, when the first pumping signal is transferred to the first node.

4. The swing width control circuit as set forth in claim 3, wherein the signal input unit comprises:
   first and second transfer gates selectively turned on in response to the control signal; and
   a pull-up device configured to pull the first node up in response to the control signal, wherein the first transfer gate transfers the first pumping signal to the first node and the second transfer gate transfers the first pumping signal to the second node.

5. The swing width control circuit as set forth in claim 3, wherein the signal processor comprises:
   a first capacitor connected between the first node and a third node;
   a buffer connected to the first node;
   a second capacitor connected between an output terminal of the buffer and a fourth node;
   a first pull-up device connected between the third node and the supply voltage, the first pull-up device pulling the third node up in response to a signal from the fourth node;
   a second pull-up device connected between the fourth node and the supply voltage, the second pull-up device pulling the fourth node up in response to a signal from the third node;
   a first transistor connected between the fourth node and a fifth node, the first transistor being turned on in response to a signal from the first node; and
   a third capacitor connected between the fifth node and the second node.

6. The swing width control circuit as set forth in claim 5, wherein the first pull-up device and the second pull-up device are NMOS transistors and the first transistor is a PMOS transistor.

7. The swing width control circuit as set forth in claim 5, wherein the signal processor further comprises a second transistor connected between the fifth node and a ground voltage, the second transistor being turned on in response to the signal from the first node.

8. The swing width control circuit as set forth in claim 1, wherein the second swing width is set to twice the first swing width.

9. The swing width control circuit as set forth in claim 1, wherein the swing width holding device is a capacitor coupled to the specific node.

* * * * *